Feb. 18, 1936.  P. J. M. TORCHET  2,031,554
RECOVERY OF THE GASES AND DUST EVOLVED IN
THE ELECTROLYTIC MANUFACTURE OF ALUMINIUM
Filed April 4, 1934
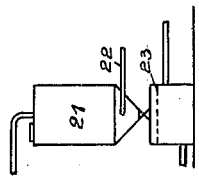
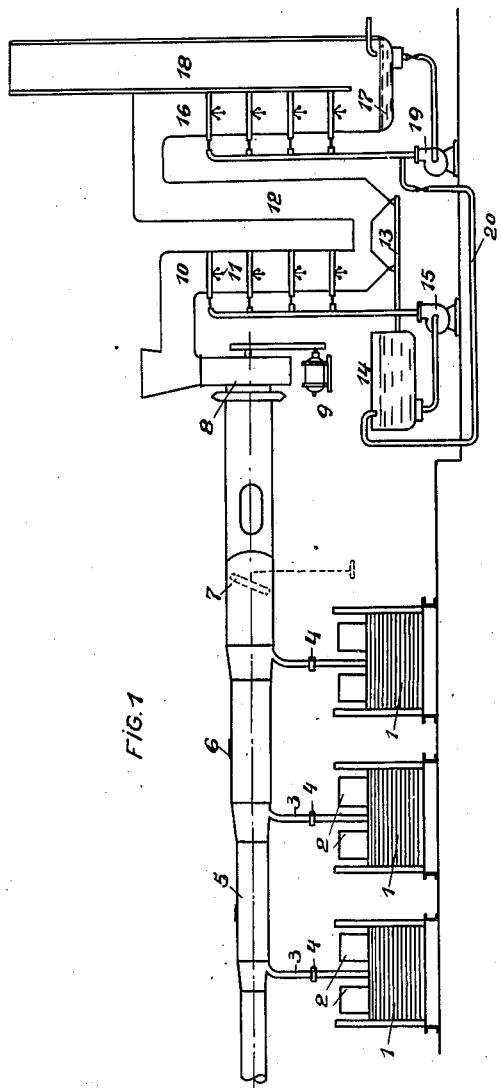
INVENTOR
PIERRE J. M. TORCHET
by his attorneys
Howson and Howson Patented Feb. 18, 1936

2,031,554

UNITED STATES PATENT OFFICE

2,031,554

RECOVERY OF THE GASES AND DUST EVOLVED IN THE ELECTROLYTIC MANUFACTURE OF ALUMINIUM

Pierre Jean Michel Torchet, St. Jean de Maurienne, France, assignor to "Compagnie de Produits Chimiques et Electrométallurgiques Alais, Froges et Camargue", Paris, France, a corporation of France Application April 4, 1934, Serial No. 719,001
In France April 5, 1933

3 Claims. (Cl. 204—20)

In the manufacture of aluminium through electrolysis of alumina dissolved in melted fluorides, the oxygen that is produced goes to the anode, where it produces, through combustion, a mixture of CO and $CO_2$. Fluorides are also conveyed to the anode; in the presence of moisture, they yield hydrofluoric acid, which is also evolved in the form of vapours. Furthermore, alumina and fluorides are mechanically carried along and mixed with the gases, the whole amounting to important losses.

Certain elements of these gases and dust, which escape from aluminium tanks, in particular hydrofluoric acid, are very valuable and it has been known for a long time that it was advantageous to recuperate them.

It has already been endeavoured to collect and recuperate the gases escaping from tanks for the electrolytic treatment of aluminium. The gases escaping through the outlet ports of the roofs of electrolytic plants were collected. The gases resulting from the electrolytic treatment are then diluted in such a mass of air from the atmosphere that the suction of the smokes and the destruction of the latter become practically impossible; the gases collected were washed with water but in the solutions obtained, the fluorides that were present were in such a state of dilution that it was impossible to recuperate them through industrial methods.

The object of the present invention is to provide a method and apparatus for the industrial recovery of valuable products contained in the gases escaping from tanks for the electrolytic production of aluminium: alumina dust, cryolite dust, fluoride vapours, hydrofluoric acid vapours, tars and tarry soots, carbon monoxide, carbon dioxide, mixed with the surrounding air.

In order to obtain this industrial result, it was found that the dilution of the dusts and gases in question in the surrounding air must be reduced to a minimum.

This necessary condition can be complied with by making use of a closed container mounted on the upper part of each electrolytic tank.

The first idea was to practically utilize this closing device on aluminium production tanks when the latter comprise an anodic system constituted by one or several continuous electrodes extending throughout the closed container with the interposition of fluidtight packings. Such a tank provided with continuous electrodes is so regular in its working that a permanent supervision becomes unnecessary. On the other hand the electrodes need not be changed and adjusted and it suffices to provide the container with movable shutters permitting the operator to intervene when this is necessary, which does not occur often and is always very quickly done.

Special conduits, which prevent the gases from escaping, may be provided for the introduction of the raw materials. By creating in these containers a very low drop of pressure, averaging some millimetres of water, by means of suction funnels or fans, it is possible to drive in a conduit all the dusts, gases, vapours escaping from electrolytic tanks. These gases are not diluted in too large a volume of air, and the mass of this air depends upon the fluid tightness of the joints and the importance of the drop of pressure that is created.

The method according to the present invention can also be applied to discontinuous electrodes. In this case it is necessary to make use of hoods and to connect them to counterweights permitting to lift them sufficiently high for making it possible to change and adjust the electrodes.

For practical purposes, the gases are collected in such manner that a series of tanks is connected in parallel to a common washing device. This washing device is first intended to separate the particles of dust contained in the gases, and secondly to collect and neutralize the fluorous gases and to transform them into products apt to be utilized. This can be done in several ways. It is for instance possible to wash the gases with an alkaline solution. Use can be made either of soda lye or of a solution of sodium carbonate, either in the presence of sodium bicarbonate or not. If use is made of a solution of sodium carbonate, which has proved to be advantageous, sodium fluoride in solution is obtained according to the following reaction:

$$2HF + CO_3Na_2 = CO_2 + H_2O + NaF$$

The solution is concentrated by circulation, dissolved for instance according to the counter-current principle. The solution of sodium fluoride is then treated with aluminium fluoride in solution or in the hydrated solid state. Cryolite precipitates according to the following general equation:

$$Al_2F_6 + xNaF = Al_2F_6 \cdot xNaF$$

When hydrated solid aluminium fluoride is employed the ratio of cryolite that is obtained varies according as the treatment is performed in the hot or in the cold state, according to the state of hydration of the aluminium fluoride that is used and to the size of its grains.

Artificial cryolite can also be precipitated directly during the washing operation itself.

The gases washed with a solution of sodium aluminate would also yield cryolite.

It would also be possible to separate the solid elements contained in the gases (alumina, carbon, tar oil, etc.) which might mix with the precipitate of cryolite, for instance through electrostatic precipitation, etc.

Important amounts of cryolite can thus be recuperated, in a form in which it can be directly utilized. For practical purposes it was possible to recuperate up to 50% of the amount of fluor consumed in electrolytic tanks.

The mixture of CO and $CO_2$ that is evolved in the tank, during the electrolytic treatment, generally produces with air an explosive mixture. By blowing air into the tank it is possible to cause the gases to burn above the upper part of the bath. However, the gases of aluminium tanks escape so slowly and in such a manner that a more or less important amount of CO always escapes combustion. It is therefore necessary to inject an excess of air into the tank in order to make sure that the concentration of CO is always higher than the limit of explosion.

A preferred embodiment of the present invention will be hereinafter described with reference to the accompanying drawing, given merely by way of example and in which:

Fig. 1 is a diagrammatic elevational view of a plant permitting to carry out the process above described;

Fig. 2 is a diagrammatic elevational view of a detail of this plant.

I is a closed tank for the production of aluminium provided with shutters on either side. These shutters can be lifted and are provided with counterweights which are not shown in the drawing. When the shutters are lowered, the tanks are entirely closed. However there is a sufficient ingress of air for preventing the formation of explosive mixtures.

2 shows the upper part of the two rectangular electrodes extending throughout the roof of the closed tank. 3 is a pipe through which the gases can ascend and which is connected through a packing 4 with a main gas pipe 5. 6 are portholes for the cleaning of main pipe 5. 7 is a register through which the suction of the pipes can be adjusted. B is the fan, driven by motor 9, by means of which the gases are sent into washing tower 10 in which finely distributed water or another solvent of the gases is caused to trickle at 11, by means of sprays. The gases pass into pipe 12 and the solution separates and runs down through pipe 13 into basin 14, from which it is returned into washing tower 10 by means of pump 15. With such an arrangement, the solution circulates and is concentrated. From time to time it is led to precipitation basin 21 (Fig. 2), in which artificial cryolite is precipitated by stirring. Stirring is obtained in a satisfactory manner by blowing air through pipe 22. After precipitation, the solution is filtered by means of suction filter 23 and the mother waters are returned to the washing tower.

The other washing tower 16 (Fig. 1) is intended to serve to the absorption of the remaining gases containing fluorides and also of the portion of the solution driven along from tower 10. Water, or the diluted solution that has deposited at the bottom of basin 17, is sprayed therein. The washed gases are eliminated through stack 18. The solution recuperated in this washing tower is sent into the circuit by means of pump 19 and can also, with a suitable concentration, pass into basin 14 through pipe 20 in order to be sent to the first washing tower.

While I have disclosed what I deem to be a preferred embodiment, it should be well understood that I do not wish to be limited thereto as there might be changes made in the arrangement, disposition, and form of the parts without departing from the principle of my invention as comprehended within the scope of the appended claims.

What I claim is:

1. A method of recuperating valuable matters in the manufacture of aluminium by treatment, in electrolytic tanks, of alumina dissolved in melted fluorides, which comprises, collecting all the gases accumulating above the surface of the bath in a space out of contact with the atmosphere, introducing into said space an air stream which mixes with said gases so as to cool the surface of the bath and to render these gases inexplosive, and washing this mixture of gases with a soda alkaline solution.

2. A method of recuperating valuable matters in the manufacture of aluminium by treatment, in electrolytic tanks, of alumina dissolved in melted fluorides, which comprises, collecting all the gases accumulating above the surface of the bath in a space out of contact with the atmosphere, introducing into said space an air stream which mixes with said gases so as to cool the surface of the bath and to render these gases inexplosive, and washing this mixture of gases with soda lye.

3. A method of recuperating valuable matters in the manufacture of aluminium by treatment, in electrolytic tanks, of alumina dissolved in melted fluorides, which comprises, collecting all the gases accumulating above the surface of the bath in a space out of contact with the atmosphere, introducing into said space an air stream which mixes with said gases so as to cool the surface of the bath and to render these gases inexplosive, and washing this mixture of gases with sodium carbonate.

PIERRE JEAN MICHEL TORCHET.